US012704212B2

(12) United States Patent
Kling E Silva et al.

(10) Patent No.: US 12,704,212 B2
(45) Date of Patent: Aug. 11, 2026

(54) DRIFTING DEVICE AND METHOD FOR TUBULAR GOODS

(71) Applicant: VALLOUREC OIL AND GAS FRANCE, Aulnoye-Aymeries (FR)

(72) Inventors: Lucas Kling E Silva, Meudon (FR); Sébastien Petit, Meudon (FR); Alastair Brodie, Meudon (FR); Nicolas Wilbert, Meudon (FR); Nestor Medeiros, Meudon (FR)

(73) Assignee: VALLOUREC OIL AND GAS FRANCE, Aulnoye-Aymeries (FR)

( * ) Notice: Subject to any disclaimer, the term of this patent is extended or adjusted under 35 U.S.C. 154(b) by 514 days.

(21) Appl. No.: 18/006,759

(22) PCT Filed: Jul. 28, 2021

(86) PCT No.: PCT/EP2021/071180

§ 371 (c)(1),
(2) Date: Jan. 25, 2023

(87) PCT Pub. No.: WO2022/028988

PCT Pub. Date: Feb. 10, 2022

(65) Prior Publication Data

US 2023/0258293 A1 Aug. 17, 2023

(30) Foreign Application Priority Data

Aug. 4, 2020 (EP) .................................... 20189461

(51) Int. Cl.
*F16L 55/40* (2006.01)
*F16L 55/32* (2006.01)
(Continued)

(52) U.S. Cl.
CPC ............... *F16L 55/40* (2013.01); *F16L 55/32* (2013.01); *G01B 11/12* (2013.01); *F16L 2101/30* (2013.01)

(58) Field of Classification Search
CPC ....... F16L 55/40; F16L 55/32; F16L 2101/30; G01B 11/12; G01B 5/043; G01S 17/48; G01S 17/87; G01S 17/88
See application file for complete search history.

(56) References Cited

U.S. PATENT DOCUMENTS 4,543,655 A * 9/1985 Condell, Jr. .......... H01S 3/0903 372/2
5,062,187 A * 11/1991 Bromley ................. B23B 29/02 408/81
(Continued)

FOREIGN PATENT DOCUMENTS

CA 2381709 C * 5/2007 ............... H02G 1/14
CN 103398665 A * 11/2013
(Continued)

OTHER PUBLICATIONS

International Search Report and Written Opinion issued Oct. 8, 2021 in PCT/EP2021/071180, filed on Jul. 28, 2021, 17 pages.

*Primary Examiner* — Octavia Hollington
(74) *Attorney, Agent, or Firm* — Oblon, McClelland, Maier & Neustadt, L.L.P.

(57) ABSTRACT

This drifting device for a tubular good includes a body, a device to propel the body through the tubular good, and at least one attachment part for attaching a cylindrical drift mandrel to the body, the attachment part is so configured to enable a degree of mobility of the cylindrical drift mandrel with respect to the body along a radial direction.

17 Claims, 7 Drawing Sheets

Figure 1:
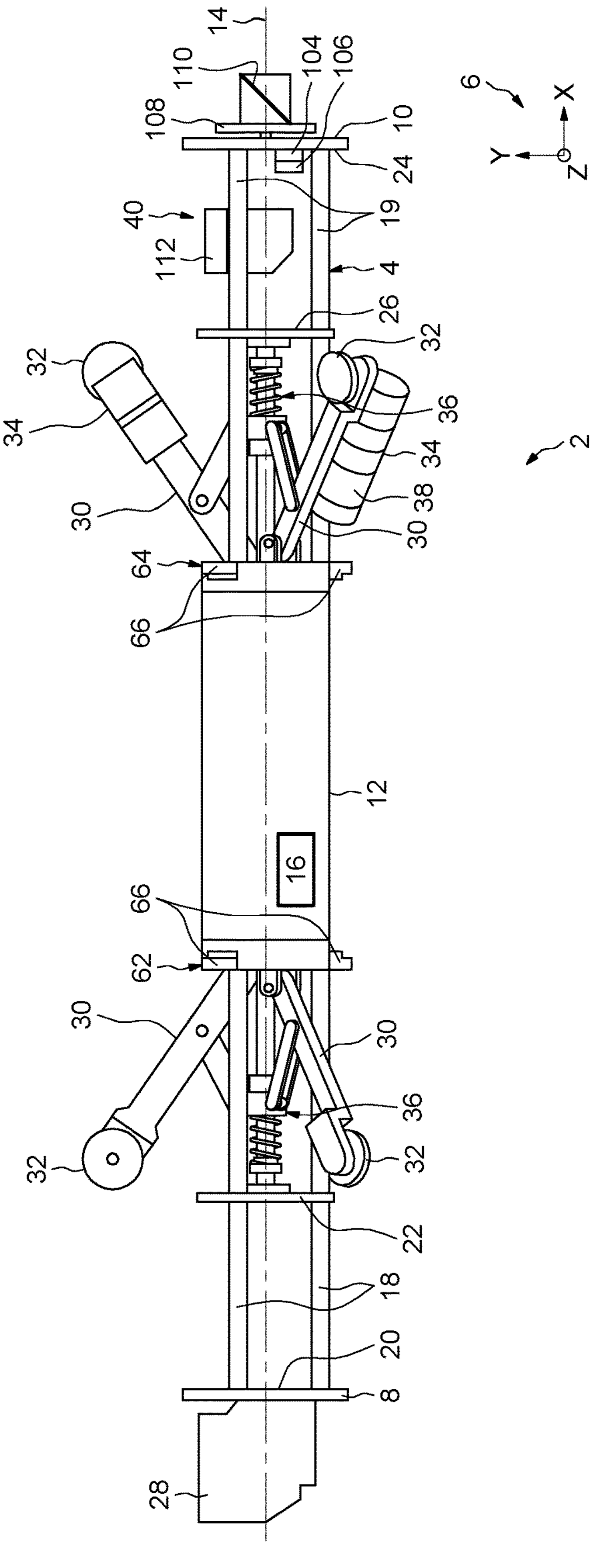

(51) Int. Cl.
*F16L 101/30* (2006.01)
*G01B 11/12* (2006.01)

(56) References Cited

U.S. PATENT DOCUMENTS

| | | | | | |
|---|---|---|---|---|---|
| 5,209,304 | A * | 5/1993 | Nice | E21B 23/10<br>166/383 |
| 6,935,423 | B2 * | 8/2005 | Kusmer | E21B 4/18<br>166/243 |
| 10,119,810 | B2 * | 11/2018 | Stigall | G01B 11/12 |
| 12,540,808 | B2 * | 2/2026 | Kling E Silva | F16L 55/32 |
| 2018/0372683 | A1 * | 12/2018 | Hauck | H01J 49/24 |
| 2023/0280146 | A1 * | 9/2023 | Kling E Silva | F16L 55/32<br>33/775 |

FOREIGN PATENT DOCUMENTS

| | | | | | |
|---|---|---|---|---|---|
| CN | 109000085 | A | | 12/2018 | |
| CN | 209325274 | U | * | 8/2019 | |
| CN | 118423023 | A | * | 8/2024 | |
| DE | 10 2017 004 475 | A1 | | 11/2018 | |
| GB | 2064121 | A | * | 6/1981 | G01B 3/002 |
| KR | 10-2017-0035047 | A | | 3/2017 | |

* cited by examiner 14
110
104
106
108
10
24
6
X
Y
Z
40
112
19
4
26
32
34
36
2
38
30
64
66
12
16
62
22
18
20
8
28

DRIFTING DEVICE AND METHOD FOR TUBULAR GOODS

The present invention relates to the technical field of drifting devices for tubular goods, in particular for oil country tubular goods.

Tubular goods manufacturers, especially in the field of oil and gas, need to meet specific quality requirements concerning internal parameters, such as the traversability.

The traversability is the capability, for a tubular good, to be passed through by an equipment. To control the traversability, a drifting device, also known as a drift mandrel, aims at controlling the free pass in the internal diameter of the tubular good. A drifting device typically includes a cylindrical drift mandrel being a test piece of a given diameter and a given length. The cylindrical drift mandrel acts as a gauge to know if an equipment of a given maximum dimension can go through the tubular good. Cylindrical drift mandrels are specified in standard API 5CT or ISO11960. This standard specifies dimensions requirements for cylindrical drift mandrels. For example, Cylindrical drift mandrel for casing and liners tubes of size nominal diameter D smaller than 9⅝ inches or 244.48 mm must have a minimum length of 152 mm and a minimum diameter of D-3.18 mm, whereas for cylindrical drift mandrel for casing and liners tubes of size nominal diameter D from 9⅝ inches or 244.48 mm to 13⅜ or 339.73 mm must have a minimum length of 305 mm and a minimum diameter of D-3.97 mm. For Cylindrical drift mandrel for casing and liners tubes of size nominal diameter D higher than 13⅜ inches or 339.73 mm must have a minimum length of 305 mm and a minimum diameter of D-4.76 mm. For Cylindrical drift mandrel for tubing tubes of size nominal diameter D 2⅞ inches or 73.03 mm and smaller must have a minimum length of 1067 mm and a minimum diameter of D-3.38 mm, whereas Cylindrical drift mandrel for tubing tubes of size nominal diameter D greater than 2⅞ inches or 73.03 mm must have a minimum length of 1067 mm and a minimum diameter of D-3.18 mm.

The term Cylindrical drift mandrels refers to drift mandrels according to standard API—5CT or ISO 11960.

Conventionally, the cylindrical drift mandrel is pushed or pulled inside the tubular good. Two ropes are attached to each respective end of the cylindrical drift mandrel, and two operators pull on the two respective ropes. If and only if the cylindrical drift mandrel can be passed through the tube on its whole length, the traversability of the tubular good is correct.

A drawback of such a process is that it requires at least two operators to perform the drifting process, and that a significant effort is required from the operators to pass the cylindrical drift mandrel through the whole length of the tubular good.

The invention aims at overcoming the above-mentioned drawback.

More specifically, the invention aims at allowing to verify the traversability of a tubular good in a way that requires less than two operators and that decreases a required effort to implement the traversability tests.

Also, there are increasing demands to know internal diameters of the tubular good along its axis. Ultrasonic inspections from exterior of the tubular good can be done in mills to retrieve such data. Nevertheless, this equipment is too bulky on the field.

Also, applicant found an operational advantage to combine both internal diameter measurements and drift operations. Gain of time and need for operators' interventions are decreased. The drifting device of the present invention allows to combine both drift measure and internal diameter measurements in one passage of equipment inside the tubular, by allowing combining the cylindrical drifting mandrel and the internal diameter measuring equipment to be mounted on the same device in such a manner both combining the cylindrical drifting mandrel and the internal diameter measuring equipment can operate simultaneously.

According to a first aspect of the invention, it is proposed a drifting device for a tubular good including a body, an actuator for propelling the body through the tubular good, and at least one attachment part for attaching a cylindrical drift mandrel to the body, wherein the attachment part is so configured to enable a degree of mobility of the cylindrical drift mandrel with respect to the body along a radial direction.

In one embodiment, the Drifting device is arranged to inspect a tubular good having a nominal internal diameter D and the drifting device comprises a cylindrical drift mandrel having a minimum outside diameter of D minus 4 mm.

Such an attachment part allows displacing the cylindrical drift mandrel without requiring to pull it by means of a transmission means such as a rope. Enabling a degree of mobility avoids generating wrong results. Roundness and/or traversability inspection of the tubular good is thus rendered easier in a reliable manner.

In the present application, the word "attach" shall be understood according to its common definition, that is securing at least one degree of mobility of a part with respect to another part.

In one embodiment, the attachment part is so configured to enable a degree of rotation of the cylindrical drift mandrel around a first radial direction, a degree of rotation of the cylindrical drift mandrel around a second radial direction, the second radial direction being not parallel to the first radial direction, a degree of translation of the cylindrical drift mandrel along the first radial direction and a degree of translation of the cylindrical drift mandrel along the second radial direction.

The attachment part thus facilitates in an optimal manner the displacement of the cylindrical drift mandrel inside the tubular good.

One may also foresee a distance sensor for measuring an inner diameter of the tubular good and/or a length of the tubular good.

In this way, the drifting device allows implementing measures typical of infernal inspection of oil country tubular goods. The work of the operator is even more facilitated and the time for inspection is decreased.

One may also foresee an elastic means including a spring.

Preferably, the elastic means includes a helical spring.

Such an elastic means allows enabling the freedom of motion along the degrees of mobility in a simple and robust manner.

In another embodiment, the attachment part includes a contact surface intended to be in axial contact with an axial surface of the cylindrical drift mandrel.

Preferably, the contact surface is tapered.

Such an embodiment allows easily centering the cylindrical drift mandrel around an axis of revolution of the tapered surface.

In another embodiment, the body includes an opening, the attachment part being received in the opening and including a locking device for releasably preventing the attachment part from leaving the opening.

One may also foresee that the body is elongated, the attachment part including a frontal surface perpendicular to a longitudinal direction of the body, the frontal surface including a circular outer edge, the attachment part including a cylindrical surface having a generatrix oriented in the longitudinal direction and extending from the circular outer edge, and a shoulder perpendicular to the longitudinal direction and extending outwards from the cylindrical surface.

With such a design of the drifting device, the frontal surface may be in axial contact with a shouldering portion of the cylindrical drift mandrel, the shoulder may be in axial contact with the axial surface and the cylindrical surface may be in radial contact with a cylindrical face of the cylindrical drift mandrel. Handling of the cylindrical drift mandrel is thus implemented in an optimal manner.

One may also foresee a plurality of attachment parts forming a first attachment set and a second attachment set, the first and second attachment sets being axially spaced apart from each other. Such a design allows attaching the cylindrical drift mandrel irrespective of an advance direction of the drifting device.

In one embodiment, each attachment set includes at least three attachment parts regularly distributed over the circumference of the body.

Such an attachment set allows firmly attaching the cylindrical drift mandrel to the body.

In another embodiment, each attachment set consists of three attachment parts.

Hence, an isostatic fixation of the cylindrical drift mandrel to the body may be implemented.

One may also foresee a cylindrical drift mandrel attached to the body via the attachment part.

One may also foresee an adapter comprising an outer portion directly attached to an axial end of the cylindrical drift mandrel and an inner portion in direct contact with the attachment part.

Such an adapter allows attaching a cylindrical drift mandrel having relatively large dimensions to a drifting device intended to be used with cylindrical drift mandrels having relatively small dimensions. Hence, several types of tubular goods may be inspected by means of one drifting device.

One may also foresee a metering device for metering an inner diameter of the tubular good.

Preferably, the metering device comprises a laser triangulation sensor.

In another embodiment, the metering device includes a laser triangulation sensor and a plate pivoting around an axial direction.

Preferably, the metering device includes an inclined mirror mounted on the plate.

Such a sensor allows accurately determining the inner diameter of the tubular good while avoiding it to be excessively costly.

In another embodiment, the laser triangulation sensor is mounted on the plate, the metering device preferably including another laser triangulation sensor mounted on the plate, the laser triangulation sensors being diametrically opposed to each other.

Such a metering device increases even more the accuracy of the inner diameter determination.

Preferably, the triangulation sensor includes a laser line emitter.

Such a laser sensor allows determining the inner diameter in a more accurate manner.

Since the same internal inspecting device may be used for performing two measures at the same time, the work of an operator in charge of internal inspecting of a tubular good is rendered easier and faster.

According to another aspect of the invention, it is proposed a drifting method for verifying internal dimension of a tubular good, wherein a cylindrical drift mandrel is attached to an attachment part of a drifting device as defined above, and the drifting device is propelled inside the tubular good.

Hence, the traversability of the tubular good may be inspected without requiring a cylindrical drift mandrel to be manually handled by an operator.

One may also foresee a step of measuring an internal diameter of the tubular good and/or a length of the tubular good, the steps of measuring and the step of propelling the drifting device inside the tubular good being performed simultaneously.

Figure 2:
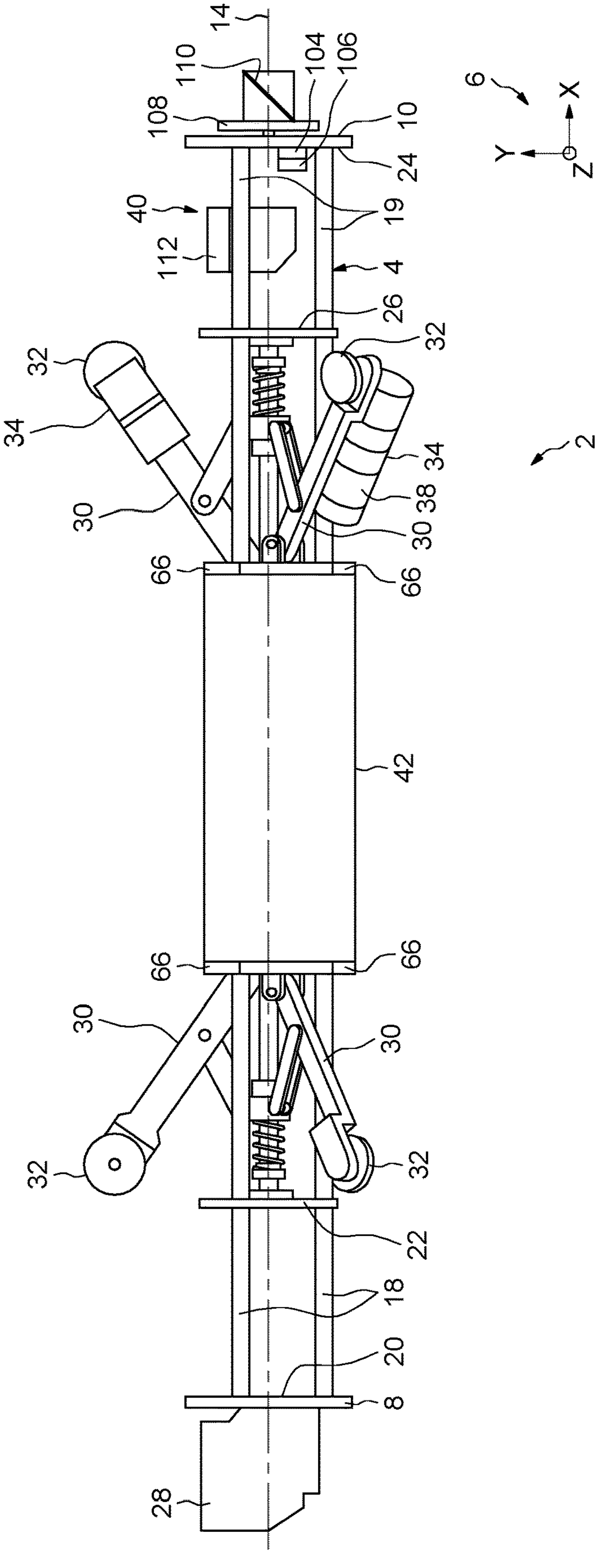
Figure 3:
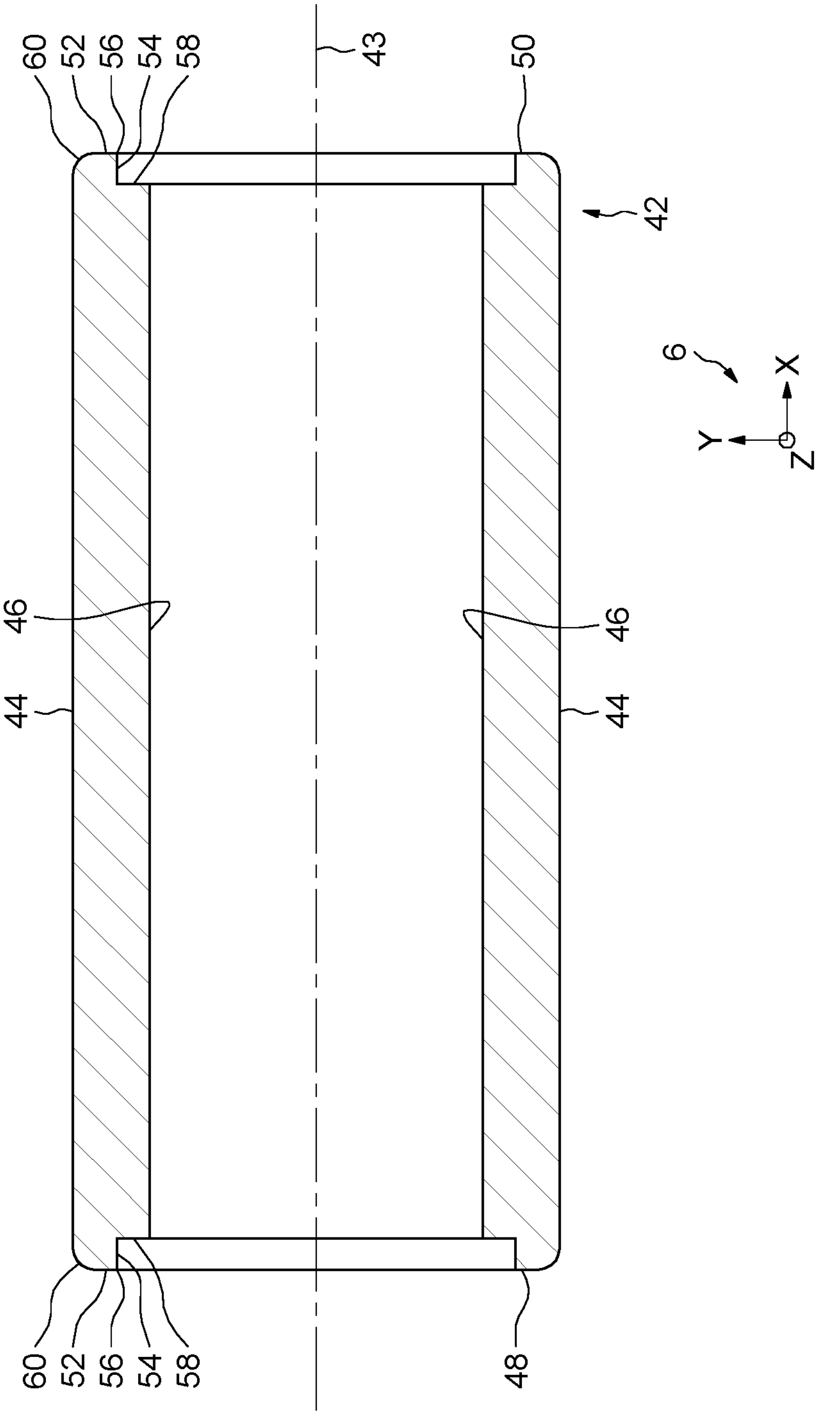
Figure 4A:
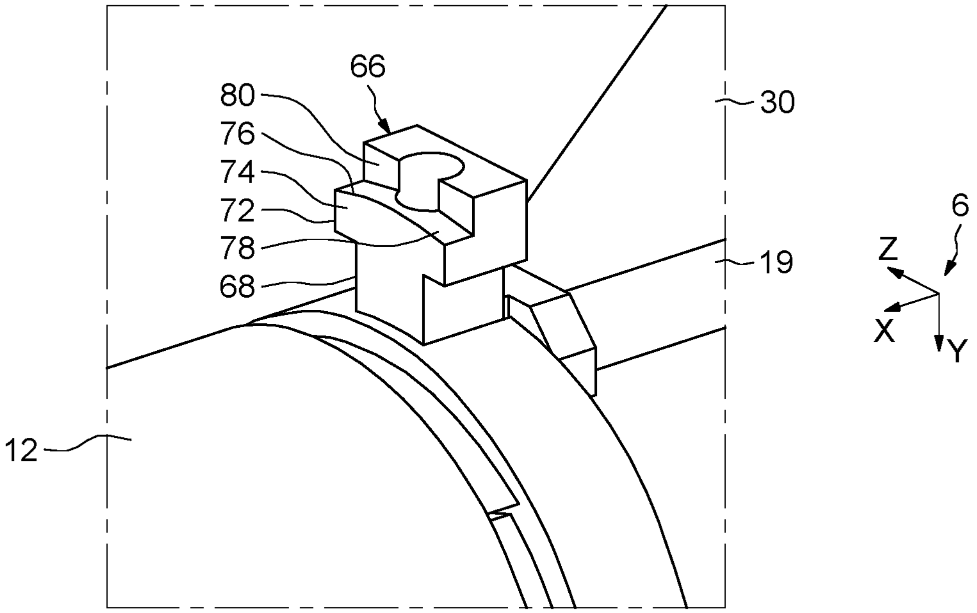
Figure 4B:
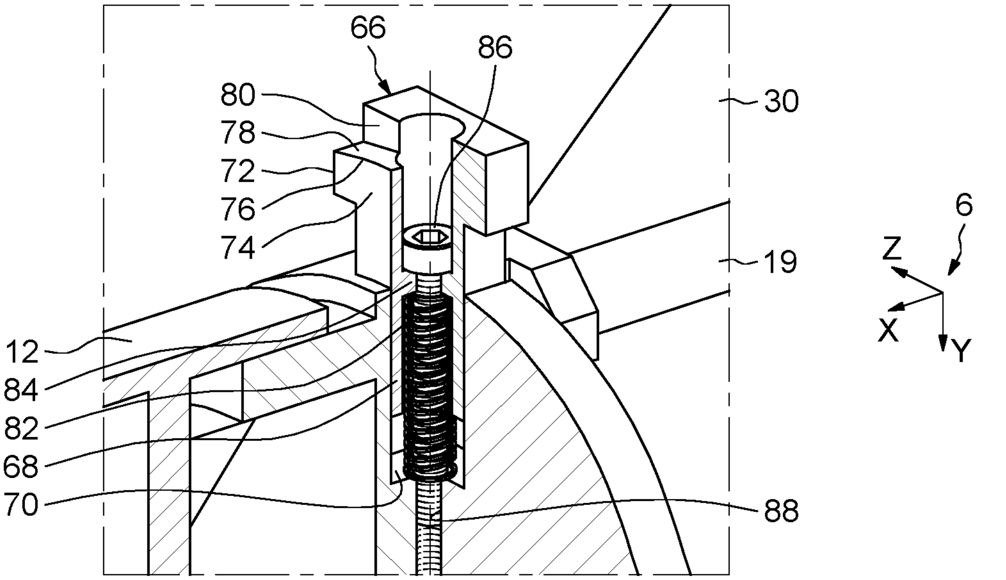
Figure 4C:
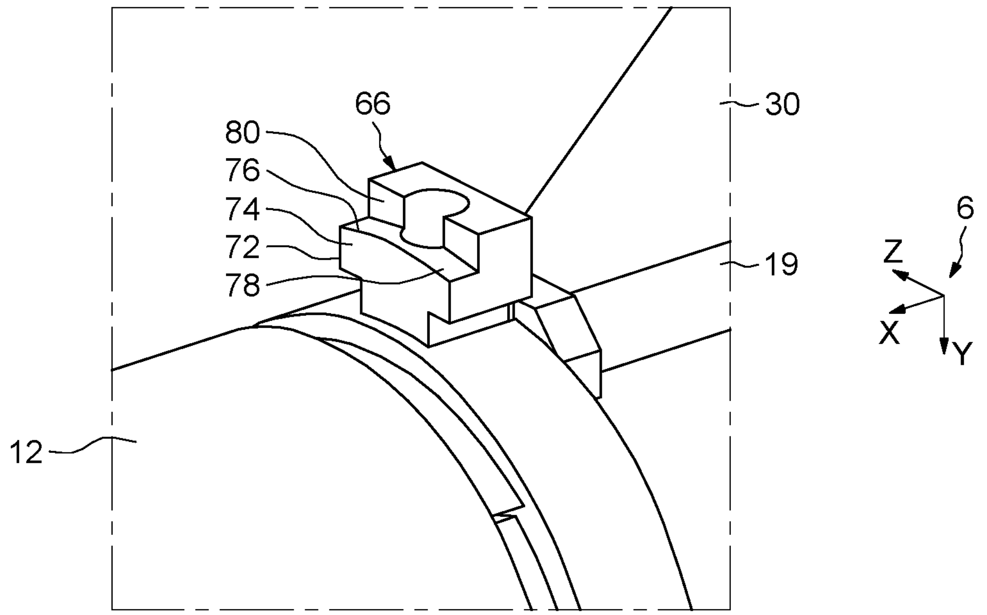
Figure 4D:
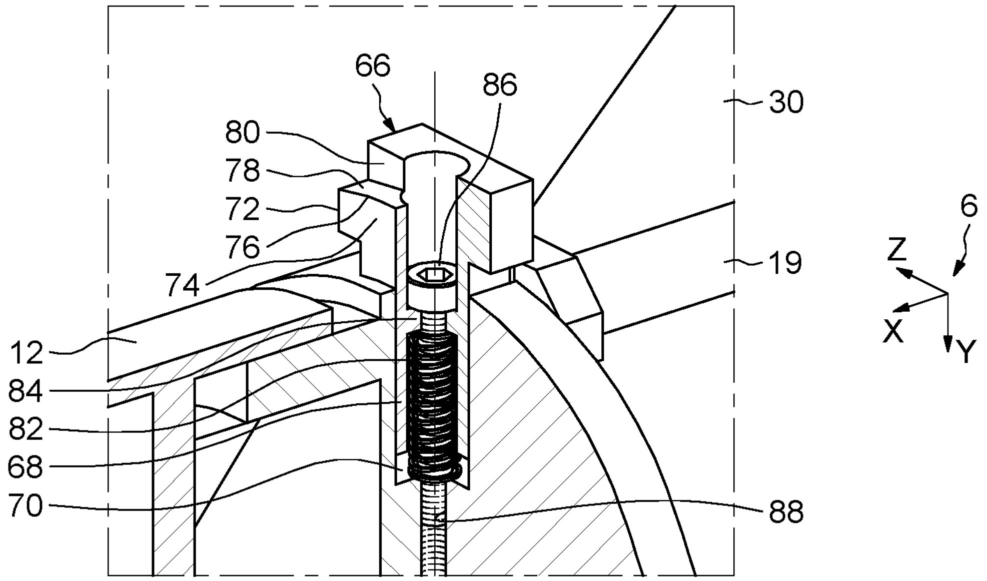
Figure 5:
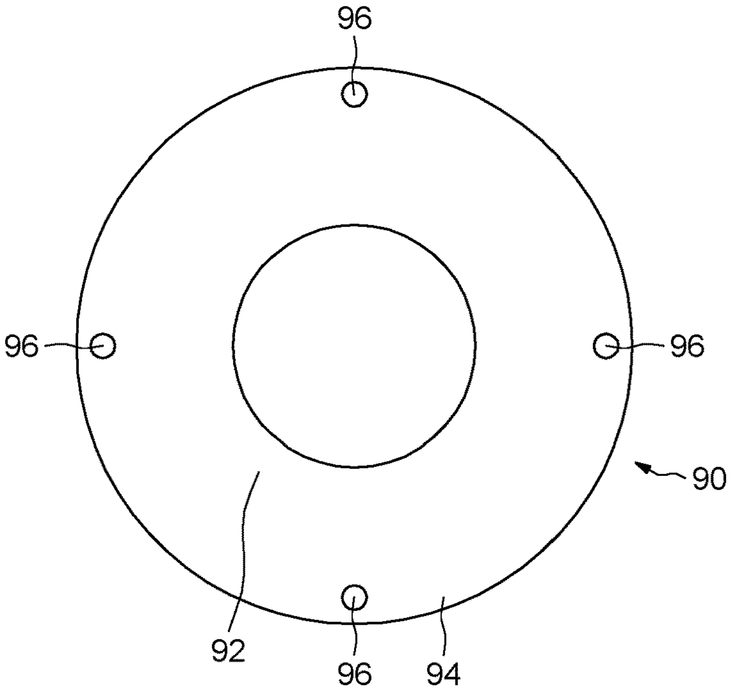
Figure 6:
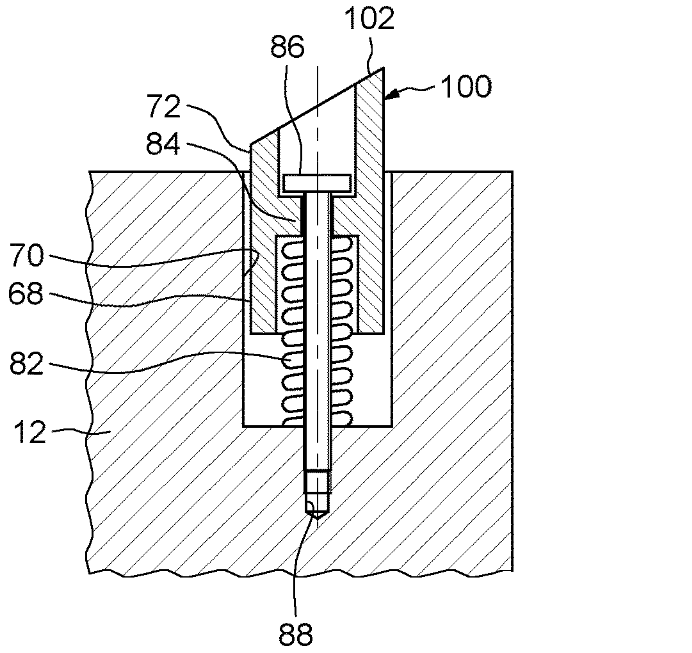
Figure 7:
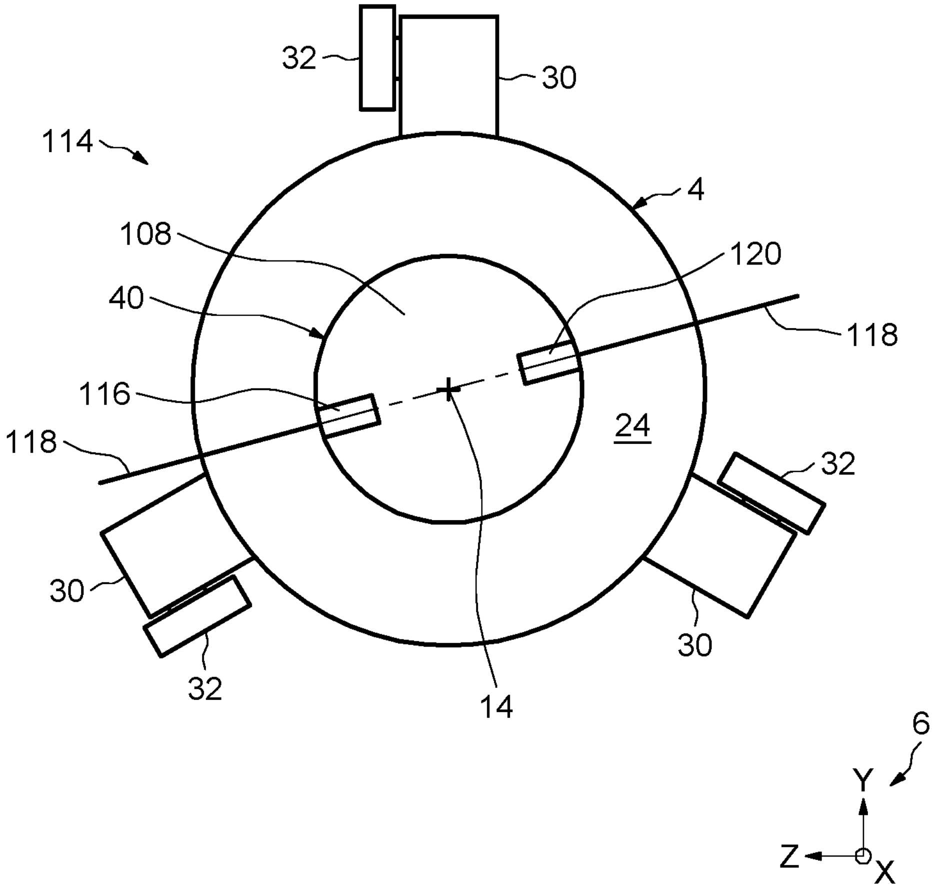

The present invention and its advantages will be better understood by studying the detailed description of specific embodiments given by way of nonlimiting examples and illustrated by the appended drawings on which:

FIG. 1 is a side view of a drifting device according to a first embodiment of the invention, FIG. 2 is a side view of the drifting device of FIG. 1 including a cylindrical drift mandrel, FIG. 3 is a cross-sectional view of the cylindrical drift mandrel of FIG. 2, FIGS. 4A, 4B, 4C and 4D are detail views, isometric and in partial cross section, of an attachment part of the drifting device of FIGS. 1 and 2, FIG. 5 is a front view of an adapter of the drifting device of FIG. 1, FIG. 6 is a detail view, in cross section, of an attachment part of a drifting device according to a second embodiment of the invention, and FIG. 7 is a detailed view of a drifting device according to a second embodiment of the invention.

With reference to FIG. 1, it is schematically depicted a drifting device 2. The drifting device 2 aims at controlling internal parameters of a tubular good (not depicted), for instance the traversability and/or the roundness of an oil country tubular good.

The drifting device 2 includes a main part 4. The main part 4 is elongated. The main part 4 includes two opposite ends 8 and 10.

It is defined an orthonormal direct vector basis 6 attached to the main part 4. The basis 6 consists of a vector X, a vector Y and a vector Z. The vector X is parallel to a longitudinal direction of the main part 4.

The main part 4 includes a body 12. The body 12 forms a cylinder of revolution about an axis 14 parallel to the vector X and having a diameter $d_{12}$. The body 12 accommodates electronics 16 of the drifting device 2.

In the present application, the word “cylindrical” and variations thereof will be understood according to its common definition, being namely that a cylindrical surface is a surface consisting of all the points on all the lines which are parallel to a given line and which pass through a fixed plane curve in a plane not parallel to the given line.

In the present application, unless specified otherwise, the terms “axial”, “radial”, “tangential” and variations thereof will be understood referring relative to the axis 14.

The main part 4 includes a plurality of, e.g. three structural rods 18 and a plurality of, e.g. three structural rods 19 attached to the body 12. The structural rods 18 and 19 are cylindrical along the direction of the vector X. In the depicted embodiment, the structural rods 18 and 19 are cylinders of revolution having the same diameter $d_{18}$. The structural rods 18 and 19 are respectively located on each side of the body 12.

The main part 4 includes two structural plates 20 and 22 attached to the structural rods 18. The structural plate 20 is positioned proximate to the end 8. The structural plate 22 is positioned axially between the structural plate 20 and the body 12. The main part 4 includes two structural plates 24 and 26 attached to the structural rods 19. The structural plate 24 is positioned proximate to the end 10. The structural plate 26 is positioned axially between the structural plate 24 and the body 12. The plates 20, 22, 24 and 26 are cylinders of revolution around the axis 14 and having the diameter $d_{12}$.

The drifting device 2 includes a battery 28 attached to the structural plate 20. The battery 28 is electrically linked to the body 12 to provide the electronics 16 with electrical energy.

To propel the main part 4 in a tubular good, the drifting device 2 includes a plurality of, e.g. six pivoting arms 30. Namely, three pivoting arms 30 are provided at one end of the body 12 and three pivoting arms 30 are provided at the other end of the body 12. Each pivoting arm 30 includes an end mechanically linked to the body 12, and another end including a wheel 32 intended to contact radially an inner cylindrical surface of the tubular good. The mechanical link between the pivoting arms 30 and the body 12 allows the pivoting arm 30 to rotate, with reference to the body 12, around respective tangential axes.

The drifting device 2 further includes a plurality of, e.g. two electric motors 34 mounted on two of the six pivoting arms 30. The electric motors 34 are able to drive the wheels 32 of the corresponding pivoting arms 30 in rotation. When the wheels 32 are in a regular contact with an inner cylindrical surface of the tubular good, the rotation of the wheels 32 results in a propulsion of the body 12 inside the tubular good.

The drifting device 2 includes two elastic return assemblies 36 respectively associated to the structural plates 22 and 26. The elastic return assemblies 36 include each a cylinder of revolution secured to the respective plate 22 or 26 and secured to the body 12, a spring mounted on the cylinder of revolution, a sleeve pushed towards the body 12 by the spring and a plurality of connecting rods rotatably attached to the respective pivoting arms 30. Hence, the elastic return assemblies 36 allow pivoting the arms 30 in a way tending to move the wheels 32 radially outwards, with respect to the axis 14.

The drifting device 2 further includes a length encoder 38. The length optical encoder 38, in a known manner per se, is able to measure the rotation of the wheel 32 and to convert this rotation into a distance of the displacement of the body 12 inside the tubular good. Hence, the length optical encoder 38 allows measuring the length of the tubular good.

The drifting device 2 includes a metering device 40 attached to the main part 4 proximate to the end 10.

The metering device 40 includes an electric motor 104 and a plate 108 driven by the electric motor 104 in rotation around the axis 14 with respect to the main part 4. An encoder 106 allows having permanently a measure of the angular position of the plate 108. The encoder 106 may be a revolution encoder. The encoder 106 may be a revolution optical encoder.

The metering device 40 includes an inclined mirror 110. The mirror 110 is supported by the plate 108. Namely, the mirror 110 is substantially plane and forms an angle about 45° with respect to the axis 16.

The metering device 40 comprises a laser triangulation sensor 112 able to emit a laser beam along the axis 14. The laser beam reflects in the mirror 110 and is thus radially directed. Then, the laser beam may reflect against an inner cylindrical surface of the tubular good, then revert back into the mirror 110, be directed along the axis 14 and be detected by the laser triangulation sensor 112. By virtue of this arrangement, the distance between the axis 14 and the point of reflection of the laser beam on the inner surface of the tubular good may be measured. Thus, the inner diameter of the tubular good may be determined with accuracy.

In the depicted embodiments, the laser sensor 112 is a laser line emitter. Hence, the accuracy of the distance measurements by means of this sensor is even more increased.

The metering device 40 includes a laser triangulation sensor 112 able to emit a laser beam along the direction of the axis 14, a plate pivotable, with respect to the structural plate 24, around the direction of the axis 14, and an inclined mirror secured to the plate. The mirror forms an angle, with respect to the axis 14, about 45°. By virtue of this arrangement, the metering device 40 may meter an inner diameter of the tubular good.

Referring now to FIG. 2, the drifting device 2 includes a cylindrical drift mandrel 42. The cylindrical drift mandrel 42 forms a cylinder of revolution around an axis 43. When the cylindrical drift mandrel 42 is at its relaxed position as depicted on FIG. 2, the axis 43 is at the same location as the axis 14.

Referring now to FIGS. 2 and 3, the cylindrical drift mandrel 42 includes an outer surface 44 and an inner surface 46. The surfaces 44 and 46 form two cylinders of revolution around the axis 43. The cylindrical drift mandrel 42 includes two axial ends 48 and 50, with respect to the axis 43. At each end 48, 50, the cylindrical drift mandrel 42 includes an axial surface 52 with respect to the axis 43, a cylindrical face 54 extending from an inner edge 56 of the surface 52, and a shouldering portion 58 extending radially inwards, with respect to the axis 43, from the cylindrical face 54. The cylindrical drift mandrel includes a rounding 60 between an outer radial edge, with respect to the axis 43, of the surface 52 and the outer cylindrical surface 44. The outer surface 44 of cylindrical drift mandrel 42 is deprived of any object in protrusion from said outer surface 44. Any object in protrusion may corrupt a drift test.

Referring to FIG. 1, the drifting device 2 includes two attachment sets 62 and 64. The attachment sets 62 and 64 are respectively located at each axial end of the body 12. The attachment set 62 is intended to support the end 48 of the cylindrical drift mandrel 42 and the attachment set 64 is intended to support the end 50 of the cylindrical drift mandrel 42. Hence, the attachment sets 62 and 64 are intended to link mechanically the cylindrical drift mandrel 42 to the body 12.

To that end, each of the attachment sets 62 and 64 includes three attachment parts 66 regularly distributed over the circumference of the cylindrical body 12. One attachment part 66 will now be described with reference to the FIGS. 4A to 4D.

Namely, FIG. 4A shows an isometric view of an attachment part 66 in a relaxed configuration, FIG. 4B shows an isometric, partial cross-sectional view of the attachment part 66 in the relaxed configuration, FIG. 4C shows an isometric view of the attachment part 66 in a retracted configuration and FIG. 4D shows an isometric, partial cross-sectional view of the attachment part 66 in the retracted configuration.

The attachment part 66 includes a radial inner portion 68 at least partially received in an opening 70 of the body 12. In the depicted embodiment, the portion 68 and the opening 70 have a rectangular cross-section in the plane perpendicular to the radial direction. This allows having the attachment part 66 moveable in translation along the radial direction with respect to the body 12.

The attachment part 66 includes a radial outer portion 72. The radial outer portion 72 includes a frontal surface 74 radially outwardly delimited by a circular outer edge 76 having a diameter $d_{76}$. The frontal surface 74 is parallel to the vector X. The radial outer portion 72 includes a cylindrical surface 78. The cylindrical surface 78 is directed by the direction of the vector X, the generatrix being parallel to vector X and extends from the circular outer edge 36. The radial outer portion 72 includes a shoulder 80. The shoulder 80 is perpendicular to the direction of vector X. The shoulder 80 extends radially outwards from the cylindrical surface 78. The shoulder 80 is axially offset relative to the frontal surface 74.

Hence, when the cylindrical drift mandrel 42 is mounted on the body 12, it is possible to have the frontal surface 74 in axial contact with the shouldering portion 58, the cylindrical surface 78 in radial contact with the cylindrical face 54 and the shoulder 80 in contact with the axial surface 52. In other words, a contact surface is formed by the frontal surface 74 and the shoulder 80 to be in axial contact with an end 48 or 50 of the cylindrical drift mandrel 42.

As visible on the cross-sectional views of FIGS. 4B and 4D, a helical spring 82 is inserted inside the opening 70, between the body 12 and an inner shoulder 84 of the attachment part 66. The spring 82 forms an elastic return to recall the attachment part 66 towards its relaxed position as depicted on FIGS. 4A and 4B.

The attachment part 66 includes a locking device 86, such as a screw 86 including a head in axial contact with the inner shoulder 84, and a threaded portion cooperating with a threaded bore 88 extending radially inwards from the opening 70.

In order to perform a drifting method of a tubular good, the drifting device 2 may be introduced together with the cylindrical drift mandrel 42 inside the tubular good. More specifically, the cylindrical drift mandrel 42 is attached to the body 12 by means of the attachment part 66. In such conditions, the cylindrical drift mandrel 42 may move in rotation around two axes respectively parallel to the vectors Y and Z and in translation along the direction of the vectors Y and Z. Hence, the same drift test is implemented as when a conventional drift mandrel is passed through the tubular good.

When the degrees of mobility do not allow the cylindrical drift mandrel 42 to pass through a portion of the tubular good, the cylindrical drift mandrel 42 is blocked and the drifting device 2 goes back to its starting point. Hence, the cylindrical drift mandrel 42 may be removed from the tubular good and the traversability of the tubular good is considered unproper.

In the meantime, length and inner diameter measurements may be implemented by means of the length encoder 38 and the metering device 40. Since it allows implementing a drifting method and measuring the inner diameter of the tubular good, the drifting device can achieve two operations at the same time leading to operational savings on field.

If it is necessary to use a cylindrical drift mandrel having different dimensions, one may replace the cylindrical drift mandrel with another one by performing, successively, the following steps:

- removing the locking device or screw 86,
- removing the attachment part 66,
- replacing the springs 82 with springs having a different relaxed length,
- inserting the attachment part 66 and tightening the locking device or screw 86.

Hence, the diameter $d_{76}$ of the attachment parts 66 in relaxed position may be increased and decreased in order to adapt the attachment parts 66 to a mandrel having different dimensions, namely a different inner and/or outer diameter. Thus, the drifting device 2 may be used with different cylindrical drift mandrels in order to perform drifting methods with tubular goods having different inner diameters.

Referring now to FIG. 5, it is shown and adapter 90. The adapter 90 includes an inner portion 92 and an outer portion 94. The inner portion 92 mainly comprises an inner circular edge having a diameter $d_{92}$ substantially equal to the diameter of the cylindrical outer edge 76 on FIG. 4A. By virtue of this arrangement, the inner portion 92 may be in radial contact, by its circular edge, with the cylindrical surface 78 and in axial contact with the shoulder 80.

The outer portion 94 includes a plurality of through bores 96 so arranged to receive respective screws (not depicted). The screws are intended to cooperate with blind bores (not depicted) made in the axial ends 48 and 50 of the cylindrical drift mandrel. By virtue of this arrangement, the outer portion 94 may be attached to a cylindrical drift mandrel even if the inner diameter of the cylindrical drift mandrel is higher than the diameter $d_{76}$ of the attachment parts 66 in relaxed position. Hence, one may use a drifting device 2 even when the drifting method has to be implemented with a tubular good having a diameter much larger than the usual tubular goods.

Referring now to FIG. 6, it is depicted an attachment part 100 according to another embodiment of the invention. Same elements have the same references.

The attachment part 100 differs from the attachment part 66 in that the radial outer portion 72 includes a tapered contact surface 102. The surface 102 is intended to be in axial contact with an end 48 or 50 of the cylindrical drift mandrel 42.

The attachment part 100 thus provides an alternative embodiment to attach the cylindrical drift mandrel 42 to the body 12, and a variant in order to allow centering the cylindrical drift mandrel 42 around the axis 14.

Referring now to FIG. 7, a drifting device 114 according to another embodiment of the invention is depicted. Same elements have the same references.

The drifting device 114 differs from the drifting device 2 in that the metering device 40 includes, instead of the laser triangulation sensor 112 and of the inclined mirror 110, a laser triangulation sensor 116 affixed to the plate 108. The laser sensor 116 is so arranged to emit a radially directed laser beam 118. Thus, the internal inspection device 114 provides an alternative arrangement for the measure of the inner diameter of the tubular good.

In the embodiment depicted on FIG. 7, the internal inspection device 114 includes one supplementary laser triangulation sensor 120. The laser beam 118 emitted by the laser sensor 120 is radially directed and in opposite direction to that of the laser beam 118 emitted by the laser sensor 116. The measure of the inner diameter of the tubular good is thus rendered even more accurate.

The invention claimed is:

1. A drifting device for a tubular good, comprising:

- a body;
- an actuator mounted on the body for propelling the body through the tubular good;
- a cylindrical drift mandrel; and
- at least one attachment part attaching the cylindrical drift mandrel to the body, wherein the attachment part is so configured to enable a degree of mobility of the cylindrical drift mandrel with respect to the body along a radial direction of the body, wherein the attachment part includes a radial inner portion configured to be at least partially received within an opening of the body, and wherein the attachment part is configured to move in translation within the opening of the body along the radial direction of the body.

2. The drifting device for a tubular good, according to claim 1, wherein said tubular good having a nominal internal diameter D and wherein the cylindrical drift mandrel has a minimum outside diameter of D minus 4 mm.

3. The drifting device according to claim 1, wherein the attachment part is so configured to enable a degree of rotation of the cylindrical drift mandrel around a first radial direction, a degree of rotation of the cylindrical drift mandrel around a second radial direction, the second radial direction being not parallel to the first radial direction.

4. The drifting device according to claim 3, wherein the attachment part is so configured to further enable a degree of translation of the cylindrical drift mandrel along the first radial direction and a degree of translation of the cylindrical drift mandrel along the second radial direction.

5. The drifting device according to claim 1, further including a distance sensor for measuring an inner diameter of the tubular good and/or a length of the tubular good.

6. The drifting device according to claim 1, including an elastic means located between the attachment part and the body.

7. The drifting device according to claim 1, wherein the attachment part includes a contact surface configured to be in axial contact with an axial surface of the cylindrical drift mandrel, the contact surface being tapered.

8. The drifting device according to claim 1, wherein the body includes an opening, the attachment part being received in the opening and including a locking device for releasably preventing the attachment part from leaving the opening.

9. The drifting device according to claim 1, wherein the body is elongated, the attachment part including a frontal surface perpendicular to a longitudinal direction of the body, the frontal surface including a circular outer edge, the attachment part including a cylindrical surface with a generatrix in the longitudinal direction and extending from the circular outer edge, and a shoulder perpendicular to the longitudinal direction and extending outwards from the cylindrical surface.

10. The drifting device according to claim 1, including a plurality of attachment parts forming a first attachment set and a second attachment set, the first and second attachment sets being axially spaced apart from each other.

11. The drifting device according to claim 10, wherein each attachment set includes at least three attachment parts regularly distributed over the circumference of the body.

12. The drifting device according to claim 1, further including an adapter comprising an outer portion directly attached to an axial end of the cylindrical drift mandrel and an inner portion in direct contact with the attachment part.

13. The drifting device according to claim 1, further comprising a metering device for metering an inner diameter of the tubular good, said metering device comprising a laser triangulation sensor.

14. A drifting method for verifying internal dimension of a tubular good, wherein a cylindrical drift mandrel is attached to an attachment part of a drifting device according to claim 1, and the drifting device is propelled inside the tubular good.

15. The drifting method according to claim 14, further including a step of measuring an internal diameter of the tubular good and/or a length of the tubular good, the steps of measuring and the step of propelling the drifting device inside the tubular good being performed simultaneously.

16. The drifting device for a tubular good, according to claim 1, further comprising an elastic means located between the attachment part and the body within the opening in the body.

17. The drifting device for a tubular good, according to claim 16, wherein the elastic means is a spring.

* * * * *